(12) United States Patent
Yamamoto et al.

(10) Patent No.: US 7,212,254 B2
(45) Date of Patent: May 1, 2007

(54) ILLUMINATION OPTICAL SYSTEM, PROJECTION VIDEO SYSTEM USING THE SAME, AND INTEGRAL-TYPE VIDEO DISPLAY

(75) Inventors: Yoshiharu Yamamoto, Toyonaka (JP); Motonobu Yoshikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/302,627

(22) Filed: Dec. 14, 2005

(65) Prior Publication Data

US 2006/0092336 A1    May 4, 2006

Related U.S. Application Data

(62) Division of application No. 10/048,382, filed as application No. PCT/JP01/04380 on May 24, 2001, now Pat. No. 7,006,163.

(30) Foreign Application Priority Data

May 30, 2000    (JP)    ............................. 2000-160885

(51) Int. Cl.
    *H04N 5/74*    (2006.01)
(52) U.S. Cl. ...................... 348/742; 348/743; 348/756; 348/782; 359/639
(58) Field of Classification Search ............... 348/743, 348/756, 782; 359/639; *H04N 5/74*
    See application file for complete search history.

(56) References Cited

U.S. PATENT DOCUMENTS

| | | | |
|---|---|---|---|
| 3,729,248 A | 4/1973 | Beduchaud |
| 5,508,738 A | 4/1996 | Janssen et al. |
| 5,528,318 A | 6/1996 | Janssen |
| 5,532,763 A | 7/1996 | Janssen et al. |
| 5,548,347 A | 8/1996 | Melnik et al. |
| 5,604,525 A | 2/1997 | Kieselbach |
| 5,715,021 A | 2/1998 | Gibeau et al. |
| 5,781,251 A | 7/1998 | Otto |
| 5,920,361 A | 7/1999 | Gibeau et al. |
| 5,969,347 A | 10/1999 | Takano et al. |
| 6,020,937 A | 2/2000 | Bardmesser |
| 6,091,461 A | 7/2000 | Bardmesser |
| 6,256,073 B1 | 7/2001 | Pettitt |

(Continued)

FOREIGN PATENT DOCUMENTS

EP    0 601 666    6/1994

(Continued)

*Primary Examiner*—Brian P. Yenke
(74) *Attorney, Agent, or Firm*—Hamre, Schumann, Mueller & Larson, P.C.

(57) ABSTRACT

An illumination optical system includes a light source for emitting a plurality of different colors of light, a plurality of rotating optical scanners, and a plurality of scanning lenses. Each of the optical scanners has a reflecting surface that is formed helically around a cylindrical body. The different colors of light enter the respective reflecting surfaces in the direction parallel to the rotation axis, are reflected therefrom, and pass through the scanning lenses, so that each color of light is magnified and then scans the region to be illuminated sequentially. This makes it possible to provide an illumination optical system that can improve scanning linearity, lower noise because of its reduced wind resistance, and achieve reduction in the cost and power consumption.

5 Claims, 11 Drawing Sheets

U.S. PATENT DOCUMENTS 6,512,623 B1    1/2003    Ishihara

FOREIGN PATENT DOCUMENTS

| JP | 44-12209 | 6/1969 |
| JP | 47-1603 | 1/1972 |
| JP | 55-129938 | 10/1980 |
| JP | 57-97512 | 6/1982 |
| JP | 6-319148 | 11/1994 |
| JP | 9-95006 | 4/1997 |
| JP | 9-512648 | 12/1997 |
| JP | 11-503294 | 3/1999 |
| WO | WO 97/24881 | 7/1997 |

ILLUMINATION OPTICAL SYSTEM, PROJECTION VIDEO SYSTEM USING THE SAME, AND INTEGRAL-TYPE VIDEO DISPLAY

This application is a Division of application Ser. No. 10/048,382 filed Jan. 28, 2002 now U.S. Pat. No. 7,006,163, which is a National Stage of PCT/JP01/04380 filed May 24, 2001, which applications are incorporated herein by reference.

TECHNICAL FIELD

The present invention relates to an illumination optical system that performs sequential scanning with a plurality of different colors of light, a projection video system using the illumination optical system, and an integral-type video display using the projection video system.

BACKGROUND ART

An apparatus for magnifying and projecting an image by sequentially scanning a light valve with a plurality of different colors of light has been known from JP 6(1994)-319148 A. The apparatus includes first, second and third polygonal prisms that are arranged coaxially and shifted relative to one another by a rotation angle of 30 degrees with respect to the rotation axis. The polygonal prisms are rotated, so that the different colors of light entering the respective prisms are refracted to scan the light valve sequentially.

As described above, the rotating polygonal prism is used to deflect light incident thereon by refraction. Thus, scanning linearity depends on the number of surfaces of the prism. To improve the linearity, it is necessary to increase the number of surfaces of the prism. However, a predetermined size of each surface of the prism for receiving light has to be ensured. Therefore, an increase in the number of surfaces inevitably leads to an increase in size of the prism. Moreover, to rotate a large prism, a motor or the like, acting as a rotation system, requires a large rotation torque. When a prism having edges is rotated, the chance of wind resistance occurring increases, and thus a larger rotation torque is needed. These bring about a rise in the cost and in the power consumption. In addition, the occurrence of wind resistance causes noise, which becomes a major obstacle to showing pictures.

DISCLOSURE OF INVENTION

Therefore, with the foregoing in mind, it is an object of the present invention to provide an illumination optical system that can achieve the improvement in scanning linearity and the reductions in wind resistance, cost, power consumption and noise, a projection video system, and an integral-type video display.

A first illumination optical system of the present invention includes the following: a light source for emitting a plurality of different colors of light; a plurality of optical scanners; rotation systems for rotating the optical scanners; and at least one scanning lens. Each of the optical scanners has a reflecting surface defined by the path traced by a segment that tilts at a predetermined angle with respect to a rotation axis and moves in the direction of the rotation axis while rotating around the rotation axis. The different colors of light enter the respective reflecting surfaces of the optical scanners, are reflected therefrom, and pass through the scanning lenses, so that a region to be illuminated is scanned sequentially with the different colors of light.

A second illumination optical system of the present invention includes the following: a light source for emitting a plurality of different colors of light; a combined optical scanner; a rotation system for rotating the combined optical scanner; and at least one scanning lens. The combined optical scanner has a plurality of reflecting surfaces in the direction of a rotation axis, each reflecting surface being defined by the path traced by a segment that tilts at a predetermined angle with respect to the rotation axis and moves in the direction of the rotation axis while rotating around the rotation axis. The different colors of light enter the respective reflecting surfaces of the combined optical scanner, are reflected therefrom, and pass through the scanning lens, so that a region to be illuminated is scanned sequentially with the different colors of light.

A third illumination optical system of the present invention includes the following: a light source for emitting white light; a combined optical scanner; a rotation system for rotating the combined optical scanner; and at least one scanning lens. The combined optical scanner has a plurality of dichroic mirror surfaces in the direction of a rotation axis, each dichroic mirror surface being defined by the path traced by a segment that tilts at a predetermined angle with respect to the rotation axis and moves in the direction of the rotation axis while rotating around the rotation axis. The white light enters successively the dichroic mirror surfaces of the combined optical scanner and is separated into a plurality of different colors of light, and then the different colors of light are reflected from the respective dichroic mirror surfaces and pass through the scanning lens, so that a region to be illuminated is scanned sequentially with the different colors of light.

A fourth illumination optical system of the present invention includes the following: a light source for emitting a plurality of different colors of light; a combined optical scanner having a hollow portion; a plurality of third reflecting surfaces placed in the hollow portion of the combined optical scanner; a rotation system for rotating the combined optical scanner; and at least one scanning lens. The combined optical scanner has a plurality of first and second reflecting surfaces arranged in the direction of a rotation axis. Each of the first reflecting surfaces is defined by the path traced by a segment that tilts at a predetermined angle with respect to the rotation axis and moves in the direction of the rotation axis while rotating around the rotation axis. Each of the second reflecting surfaces is defined by the path traced by a segment that tilts at a predetermined angle with respect to the rotation axis and rotates around the rotation axis. The different colors of light enter the respective third reflecting surfaces in the direction substantially parallel to the rotation axis, then are reflected in the direction substantially perpendicular to the rotation axis, reflected from the second reflecting surfaces, reflected further from the first reflecting surfaces, and pass through the scanning lens, so that a region to be illuminated is scanned sequentially with the different colors of light.

A fifth illumination optical system of the present invention includes the following: a light source for emitting white light; a combined optical scanner having a hollow portion; a plurality of dichroic mirror surfaces placed in the hollow portion of the combined optical scanner; a rotation system for rotating the combined optical scanner; and at least one scanning lens. The combined optical scanner has a plurality of first and second reflecting surfaces arranged in the direction of a rotation axis. Each of the first reflecting surfaces is defined by the path traced by a segment that tilts at a predetermined angle with respect to the rotation axis and moves in the direction of the rotation axis while rotating around the rotation axis. Each of the second reflecting surfaces is defined by the path traced by a segment that tilts at a predetermined angle with respect to the rotation axis and rotates around the rotation axis. The white light enters successively the dichroic mirror surfaces in the direction substantially parallel to the rotation axis of the combined optical scanner and is separated into a plurality of different colors of light, and then the different colors of light are reflected from the respective dichroic mirror surfaces in the direction substantially perpendicular to the rotation axis, reflected from the second reflecting surfaces, reflected further from the first reflecting surfaces, and pass through the scanning lens, so that a region to be illuminated is scanned with the different colors of light.

A sixth illumination optical system of the present invention includes the following: a light source for emitting a plurality of different colors of light; a combined optical scanner having a hollow portion; a plurality of second reflecting surfaces placed in the hollow portion of the combined optical scanner; a rotation system for rotating the combined optical scanner; a plurality of third reflecting surfaces; and at least one scanning lens. The combined optical scanner has a plurality of first reflecting surfaces in the direction of a rotation axis, each first reflecting surface being defined by the path traced by a segment that tilts at a predetermined angle with respect to the rotation axis and moves in the direction of the rotation axis while rotating around the rotation axis. The different colors of light enter the respective second reflecting surfaces in the direction substantially parallel to the rotation axis of the combined optical scanner, then are reflected in the direction substantially perpendicular to the rotation axis, reflected from the third reflecting surfaces, reflected further from the first reflecting surfaces, and pass though the scanning lens, so that a region to be illuminated is scanned sequentially with the different colors of light.

A seventh illumination optical system of the present invention includes the following: a light source for emitting white light; a combined optical scanner having a hollow portion; a plurality of dichroic mirror surfaces placed in the hollow portion of the combined optical scanner; a rotation system for rotating the combined optical scanner; a plurality of second reflecting surfaces; and at least one scanning lens. The combined optical scanner has a plurality of first reflecting surfaces in the direction of a rotation axis, each first reflecting surface being defined by the path traced by a segment that tilts at a predetermined angle with respect to the rotation axis and moves in the direction of the rotation axis while rotating around the rotation axis. The white light enters successively the dichroic mirror surfaces in the direction substantially parallel to the rotation axis of the combined optical scanner and is separated into a plurality of different colors of light, and then the different colors of light are reflected from the respective dichroic mirror surfaces in the direction substantially perpendicular to the rotation axis, reflected from the second reflecting surfaces, reflected further from the first reflecting surfaces, and pass through the scanning lens, so that a region to be illuminated is scanned sequentially with the different colors of light.

Next, a projection video system of the present invention includes any one of the first to the seventh illumination optical system, a light modulator, an electronic circuit for driving the light modulator, and a projection optical system.

An integral-type video display of the present invention includes the above projection video system, a screen, and a case for housing the projection video system and the screen.

According to the illumination optical system of the present invention, the optical scanner or the combined optical scanner can provide favorable scanning linearity, which simplifies the configuration of an electronic circuit that constitutes the projection video system. Moreover, since the illumination optical system can achieve reduction both in wind resistance and noise, a smaller rotation torque is needed to rotate the optical scanner or the combined optical scanner. Therefore, they can be driven by a small motor, resulting in low cost and low power consumption. Thus, the present invention can provide an illumination optical system that can achieve good scanning linearity and the reductions in wind resistance, cost, power consumption and noise, a projection video system, and an integral-type video display.

BEST MODE FOR CARRYING OUT THE INVENTION

Hereinafter, embodiments of the present invention will be described with reference to the accompanying drawings.

Embodiment 1

Figure 1:
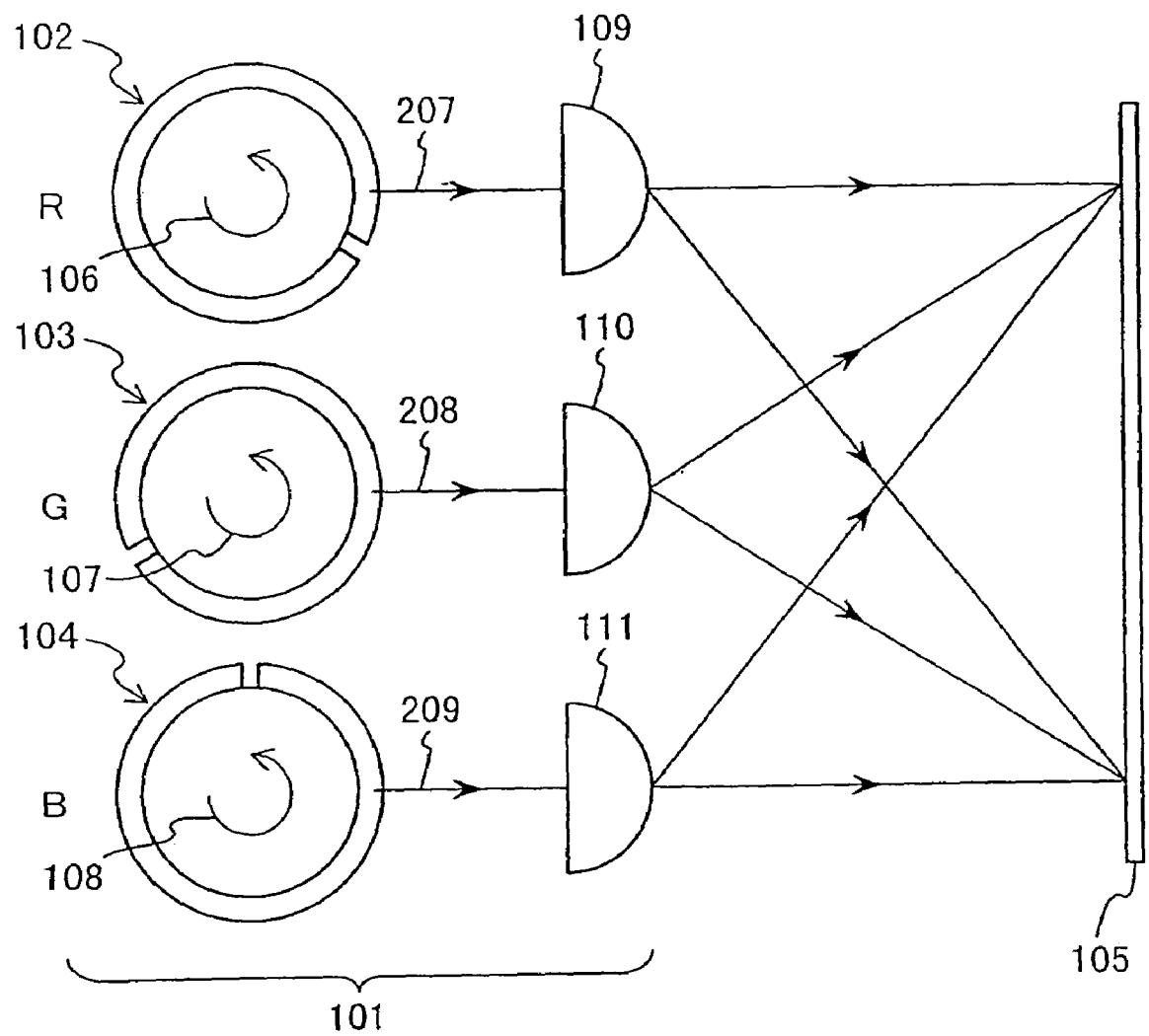
FIG. 1 is an elevational view showing the schematic configuration of an illumination optical system of Embodiment 1 of the present invention.

FIG. 1 is an elevation view showing an illumination optical system 101 of Embodiment 1 of the present invention that illuminates a region 105 to be illuminated by sequentially scanning the region 105 with a plurality of colors of light. An optical scanner 102 for scanning red light 207, an optical scanner 103 for scanning green light 208, and an optical scanner 104 for scanning blue light 209 are rotated by rotation systems (not shown) in the directions of arrows 106, 107 and 108, respectively. The red, green and blue light thus scanned are magnified in the direction of the width of the region 105 through the respective scanning lenses 109, 110 and 111, and at the same time, they scan the region 105 vertically with respect to the drawing sheet for illumination.

Figure 2:
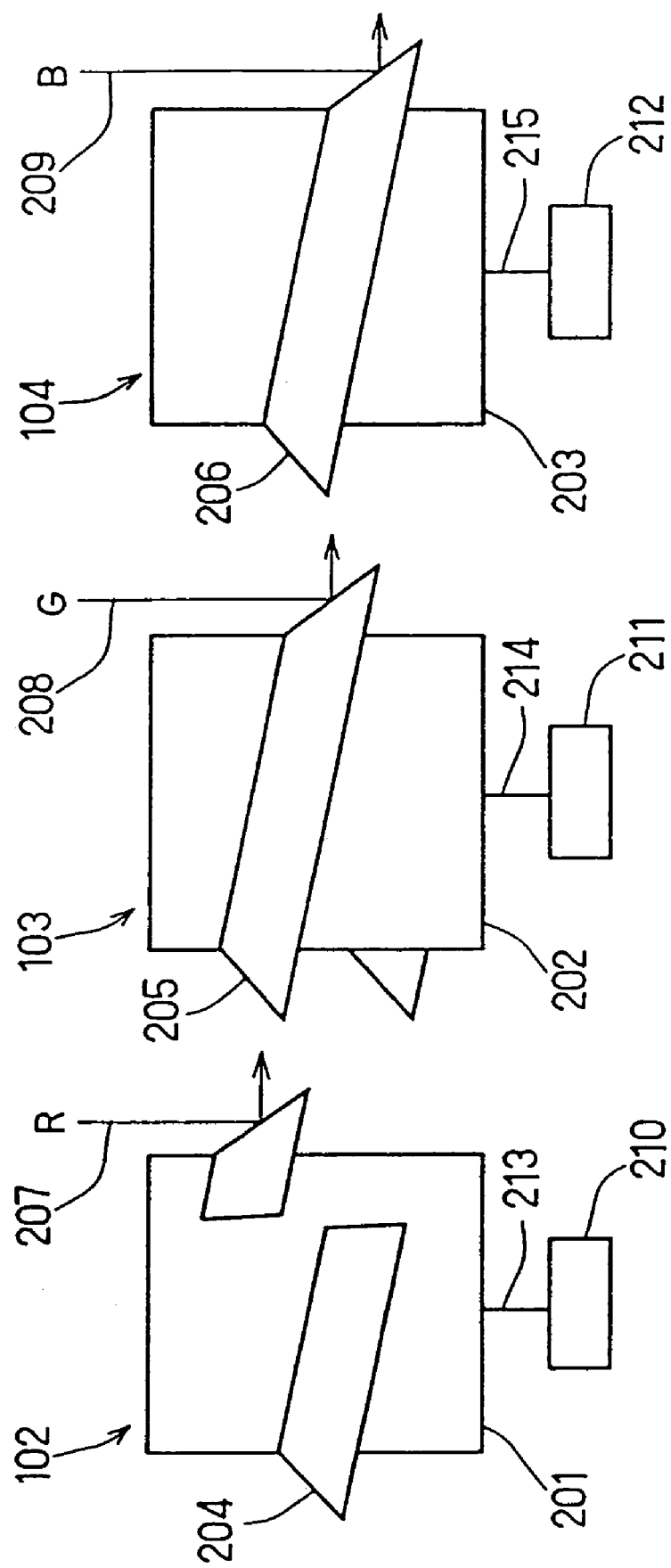
FIG. 2 is a front view showing the configurations of optical scanners of Embodiment 1 of the present invention.

FIG. 2 is a front view showing the configurations of the optical scanners 102, 103 and 104 in FIG. 1. Reflecting surfaces 204, 205 and 206, each having a collar shape, are formed around cylindrical rotating bodies 201, 202 and 203 while moving in the direction of rotation axes 213, 214 and 215, i.e., the reflecting surfaces are provided in helical fashion. Specifically, each of the reflecting surfaces 204, 205 and 206 is defined by the path traced by a segment that tilts at a predetermined angle (e.g., 45 degrees) with respect to the rotation axis and moves in the direction of the rotation axis at constant velocity while rotating around the same. In other words, those reflecting surfaces are similar in shape to a tooth flank cut on an external thread, such as a bolt, or a helical ridge formed on a screw. Each of the reflecting surfaces 204, 205 and 206 is formed over an angular range that is slightly smaller than the perimeter (i.e., 360 degrees) of the rotating body.

A light source (not shown) emits red, green and blue light. Such a light source can be composed, e.g., of a white light source and a well-known means for separating white light into its spectral components.

The red light 207 enters the reflecting surface 204 in the direction parallel to the rotation axis 213 and is reflected in the direction perpendicular to the axis. Similarly, the green light 208 enters the reflecting surface 205 in the direction parallel to the rotation axis 214 and is reflected in the direction perpendicular to the axis. The blue light 209 enters the reflecting surface 206 in the direction parallel to the rotation axis 215 and is reflected in the direction perpendicular to the axis.

The optical scanners 102, 103 and 104 are rotated by motors 210, 211 and 212, acting as rotation systems. Consequently, the incident positions of the red, green and blue light on the reflecting surfaces 204, 205 and 206 of the optical scanners are changed in the direction of the rotation axis (i.e., the direction of height), so that each color of light is scanned. Then, they pass through the scanning lenses 109, 110 and 111, thereby scanning and illuminating the region 105.

In this case, scanning linearity becomes perfect when each optical scanner rotates at constant velocity and has such a configuration that the rotation angle of each optical scanner is proportional to the amount of change in the corresponding reflecting surface in the direction of height, i.e., there is a linear relationship between the angular velocity of the segment, which defines the reflecting surface and tilts with respect to the rotation axis, rotating around the rotation axis and the velocity of the segment moving in the direction of the rotation axis.

Moreover, sequential scanning of the region 105 without overlapping colors can be achieved in the following manner: each of the optical scanners 102, 103 and 104 is formed to have the same shape and rotated while maintaining a predetermined phase difference, i.e., they are shifted relative to one another by a rotation angle (phase) of 120 degrees with respect to the rotation axis.

In the above example, the number of scanning lenses is equal to that of optical scanners, and the scanning lenses are arranged to have one-to-one correspondence with the optical scanners. However, the present invention is not limited to this configuration. For example, a single scanning lens can be used to receive each color of light reflected from the reflecting surfaces of a plurality of optical scanners. It should be noted that, in such a case, the preferred optical system includes a reflecting mirror or prism for guiding the different colors of light reflected from the reflecting surfaces to the single scanning lens and a relay lens so that each color of light has an equivalent optical path length.

In the above example, the motors 210, 211 and 212, acting as rotation systems, have one-to-one correspondence with the optical scanners 102, 103 and 104. However, the present invention is not limited to this configuration. For example, a single motor can be used to produce a driving force that is distributed by a well-known driving force distribution method to rotate the respective optical scanners 102, 103 and 104.

Embodiment 2

Figure 3:
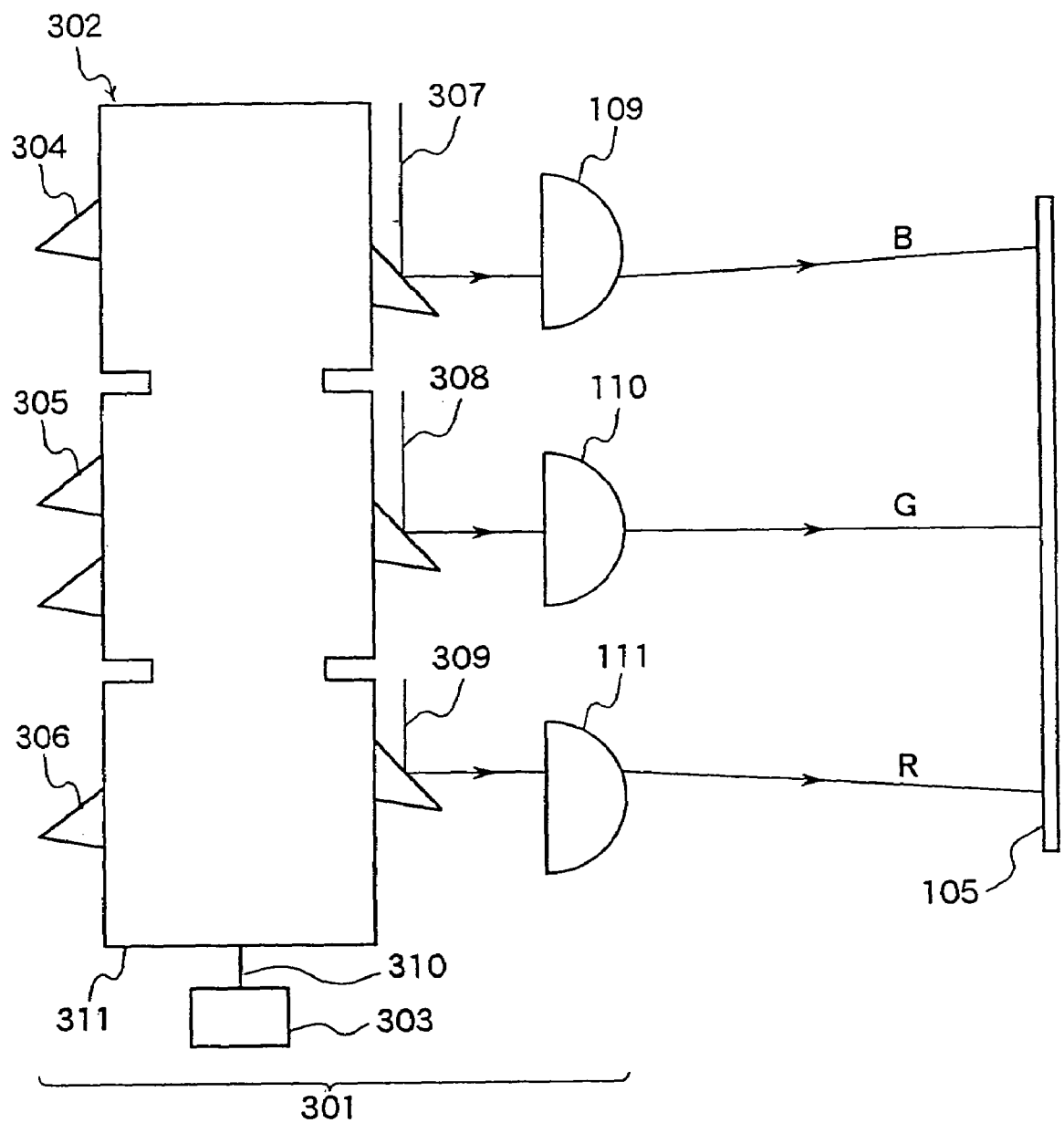
FIG. 3 is a cross-sectional view showing the schematic configuration of an illumination optical system of Embodiment 2 of the present invention.

FIG. 3 is a cross-sectional view showing an illumination optical system 301 of Embodiment 2 of the present invention that illuminates a region 105 to be illuminated by sequentially scanning the region 105 with a plurality of colors of light.

A combined optical scanner 302 has the same configuration as that obtained when the optical scanners 102, 103 and 104 of Embodiment 1 are connected coaxially in the direction of the rotation axis. The combined optical scanner 302 is rotated around a rotation axis 310 by a motor 303, acting as a rotation system. The combined optical scanner 302 includes a cylindrical rotating body 311 having a plurality of reflecting surfaces 304, 305 and 306 on its side face. Each of the reflecting surfaces 304, 305 and 306 is defined by the path traced by a segment that tilts at a predetermined angle (e.g., 45 degrees) with respect to the rotation axis and moves along the rotation axis while rotating around the same. Moreover, the three reflecting surfaces 304, 305 and 306 are formed on the rotating body 311 so that each of them has a predetermined phase difference in the rotational direction, i.e., they are shifted relative to one another by a rotation angle (phase) of 120 degrees with respect to the rotation axis.

A light source (not shown) emits red, green and blue light. Such a light source can be composed, e.g., of a white light source and a well-known means for separating white light into its spectral components.

Blue light 307 enters the reflecting surface 304 in the direction parallel to the rotation axis 310 and is reflected in the direction perpendicular to the axis. Green light 308 enters the reflecting surface 305 in the direction parallel to the rotation axis 310 and is reflected in the direction perpendicular to the axis. Red light 309 enters the reflecting surface 306 in the direction parallel to the rotation axis 310 and is reflected in the direction perpendicular to the axis.

The combined optical scanner 302 is rotated by the motor 303, acting as a rotation system. Consequently, the incident positions of blue, green and red light on the reflecting surfaces 304, 305 and 306 of the combined optical scanner 302 are changed in the direction of the rotation axis (i.e., the direction of height), so that each color of light is scanned. Then, they pass through the scanning lenses 109, 110 and 111, thereby scanning and illuminating the region 105.

In this case, scanning linearity becomes perfect when the reflecting surfaces are formed so that the rotation angle is proportional to the amount of change in the reflecting surfaces in the direction of height (i.e., the direction of the rotation axis 310).

Moreover, sequential scanning of the region 105 without overlapping colors can be achieved since the reflecting surfaces 304, 305 and 306 are formed integrally with the rotating body 311 so that each of them has a predetermined phase difference in the rotational direction, i.e., they are shifted relative to one another by a rotation angle (phase) of 120 degrees with respect to the rotation axis.

In the above example, the number of scanning lenses is equal to that of reflecting surfaces, and the scanning lenses are arranged to have one-to-one correspondence with the reflecting surfaces. However, the present invention is not limited to this configuration. For example, a single scanning lens can be used to receive each color of light reflected from a plurality of reflecting surfaces. It should be noted that, in such a case, the preferred optical system includes a reflecting mirror or prism for guiding the different colors of light reflected from the reflecting surfaces to the single scanning lens and a relay lens so that each color of light has an equivalent optical path length.

Embodiment 3

Figure 4:
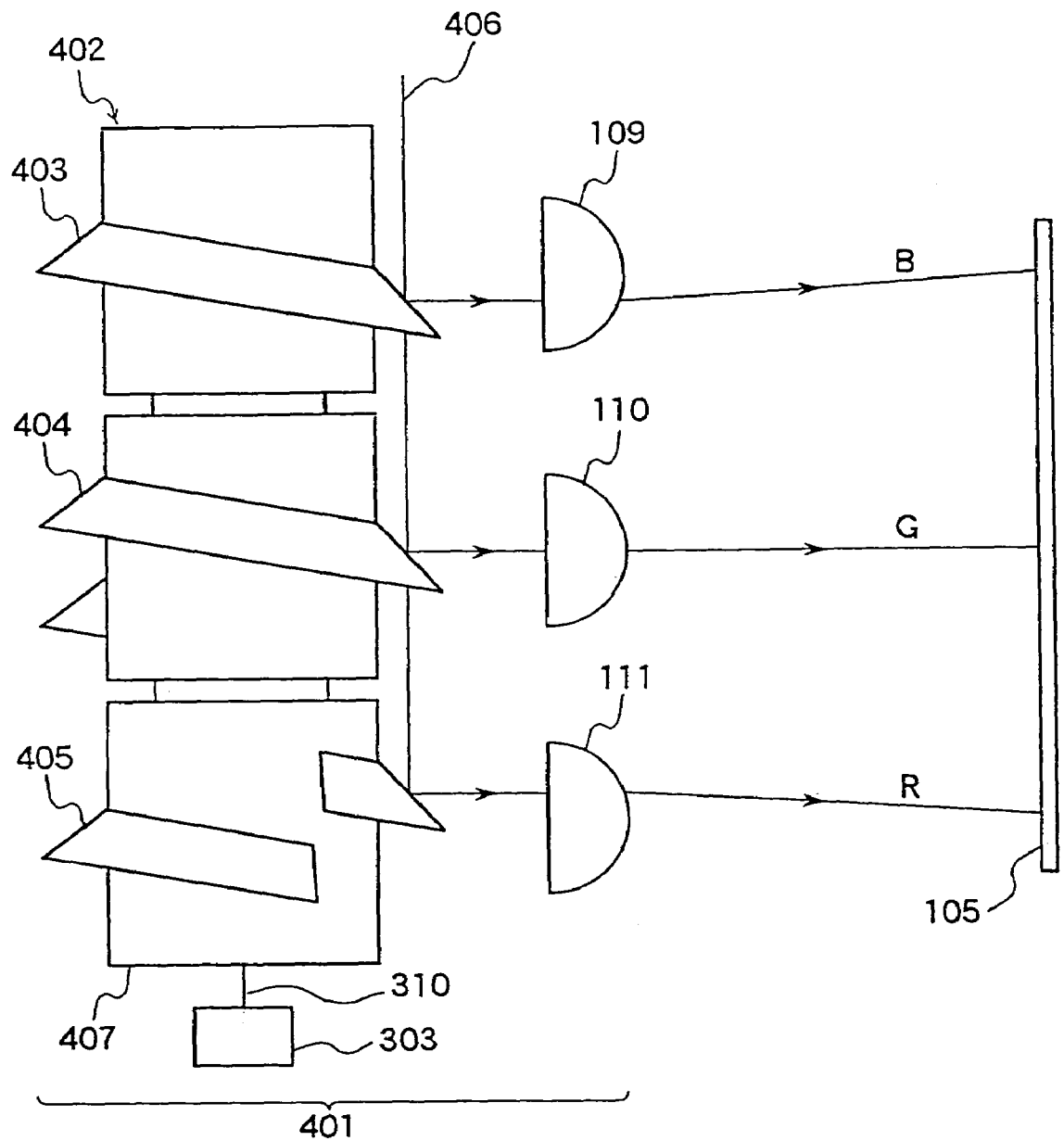
FIG. 4 is a front view showing the schematic configuration of an illumination optical system of Embodiment 3 of the present invention.
Figure 5:
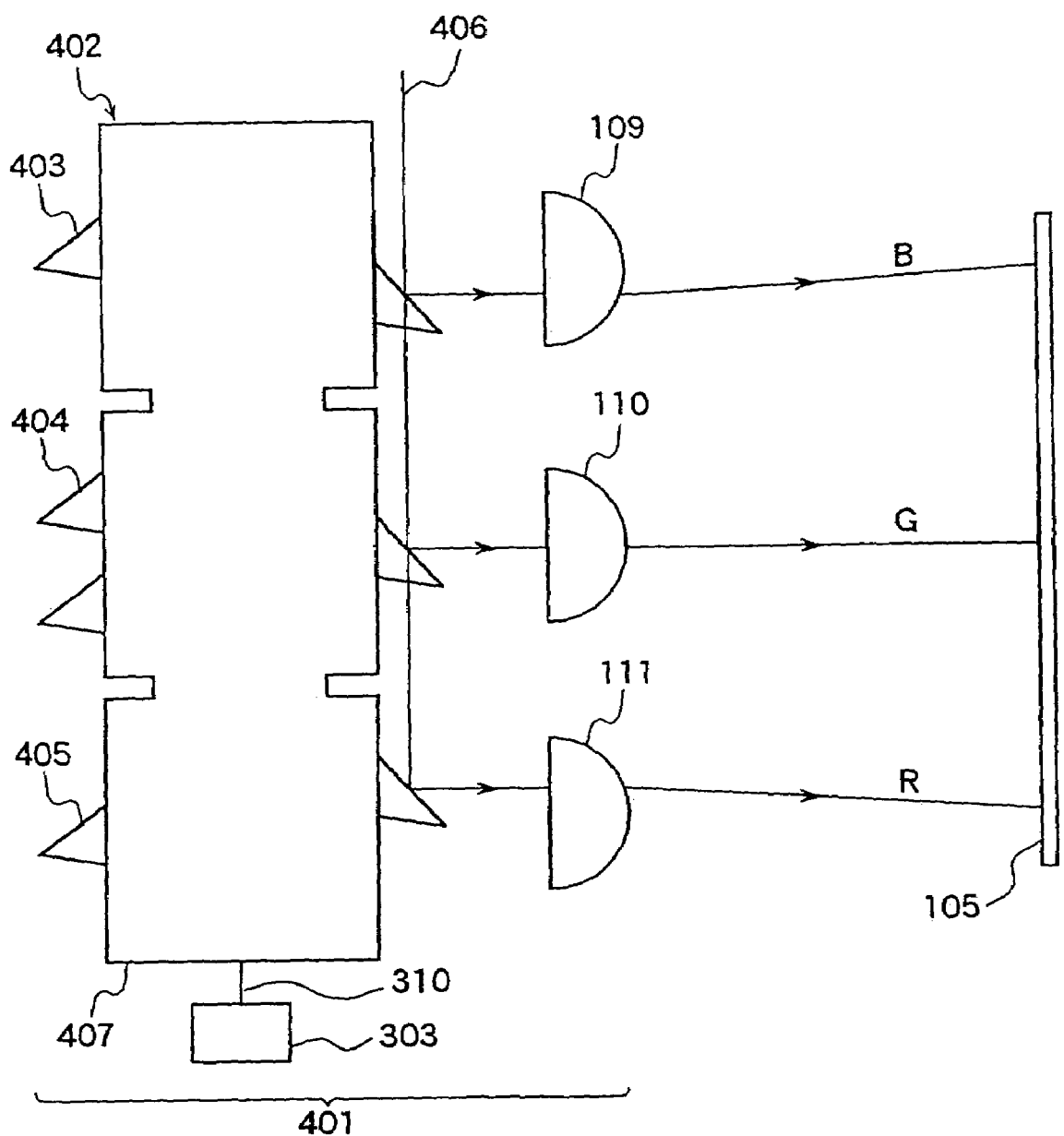
FIG. 5 is a cross-sectional view showing the schematic configuration of an illumination optical system of Embodiment 3 of the present invention.

FIG. 4 is a front view showing an illumination optical system 401 of Embodiment 3 of the present invention that illuminates a region 105 to be illuminated by sequentially scanning the region 105 with a plurality of colors of light, and FIG. 5 is a cross-sectional view thereof.

A combined optical scanner 402 is rotated by a motor 303, acting as a rotation system. The combined optical scanner 402 includes a cylindrical rotating body 407 having three dichroic mirror surfaces 403, 404 and 405 on its side face. Each of the dichroic mirror surfaces is defined by the path traced by a segment that tilts at a predetermined angle (e.g., 45 degrees) with respect to a rotation axis 310 and moves along the rotation axis while rotating around the same. Moreover, the three dichroic mirror surfaces 403, 404 and 405 are formed integrally with the rotating body 407 so that each of them has a predetermined phase difference in the rotational direction, i.e., they are shifted relative to one another by a rotation angle (phase) of 120 degrees with respect to the rotation axis, thus constituting the combined optical scanner 402.

White light 406 from a white light source (not shown) enters the dichroic mirror surface 403 in the direction parallel to the rotation axis 310, where the blue light component is reflected in the direction perpendicular to the rotation axis 310. The blue light then scans and illuminates the region 105 through a scanning lens 109. The light, after the blue light component has been filtered out, enters the dichroic mirror surface 404, where the green light component is reflected in the direction perpendicular to the rotation axis 310. The green light then scans and illuminates the region 105 through a scanning lens 110. The remaining light, after the blue and green light components have been filtered out, enters the dichroic mirror surface 405, where the red light component is reflected in the direction perpendicular to the rotation axis 310. The red light then scans and illuminates the region 105 through a scanning lens 111.

In this case, scanning linearity becomes perfect when the dichroic mirror surfaces are formed so that the rotation angle of the combined optical scanner 402 is proportional to the amount of change in the dichroic mirror surfaces in the direction of height (i.e., the direction of the rotation axis 310).

Moreover, sequential scanning of the region 105 without overlapping colors can be achieved since the dichroic mirror surfaces 403, 404 and 405 are formed integrally with the rotating body 407 so that each of them has a predetermined phase difference in the rotational direction, i.e., they are shifted relative to one another by a rotation angle (phase) of 120 degrees with respect to the rotation axis.

As described above, the order of arrangement of the dichroic mirror surfaces from the white light incident side, i.e., the order of spectral reflection characteristics is blue, green, and red. This makes it possible to suppress unnecessary spectral components in red light, which is separated lastly, with a small number of layers of the dichroic mirror surfaces. Thus, an illumination optical system that achieves higher color purity can be provided at low cost.

Moreover, the efficiency of utilization of a red light component can be increased by arranging the spectral reflection characteristics in the order of red, green, and blue. Therefore, an illumination optical system that achieves higher light utilization efficiency can be provided even if a high-pressure mercury lamp is used, whose emission spectrum is low in the red light component.

The dichroic mirror surface 405, on which the light is incident lastly, may be replaced by a general reflecting surface, as long as the incident light does not contain unnecessary spectral components. The use of such a reflecting surface can provide the same illumination optical system as that described above.

In the above example, the number of scanning lenses is equal to that of dichroic mirror surfaces, and the scanning lenses are arranged to have one-to-one correspondence with the dichroic mirror surfaces. However, the present invention is not limited to this configuration. For example, a single scanning lens can be used to receive each color of light reflected from a plurality of dichroic mirror surfaces. It should be noted that, in such a case, the preferred optical system includes a reflecting mirror or prism for guiding the different colors of light reflected from the dichroic mirror surfaces to the single scanning lens and a relay lens so that each color of light has an equivalent optical path length.

Embodiment 4

Figure 6:
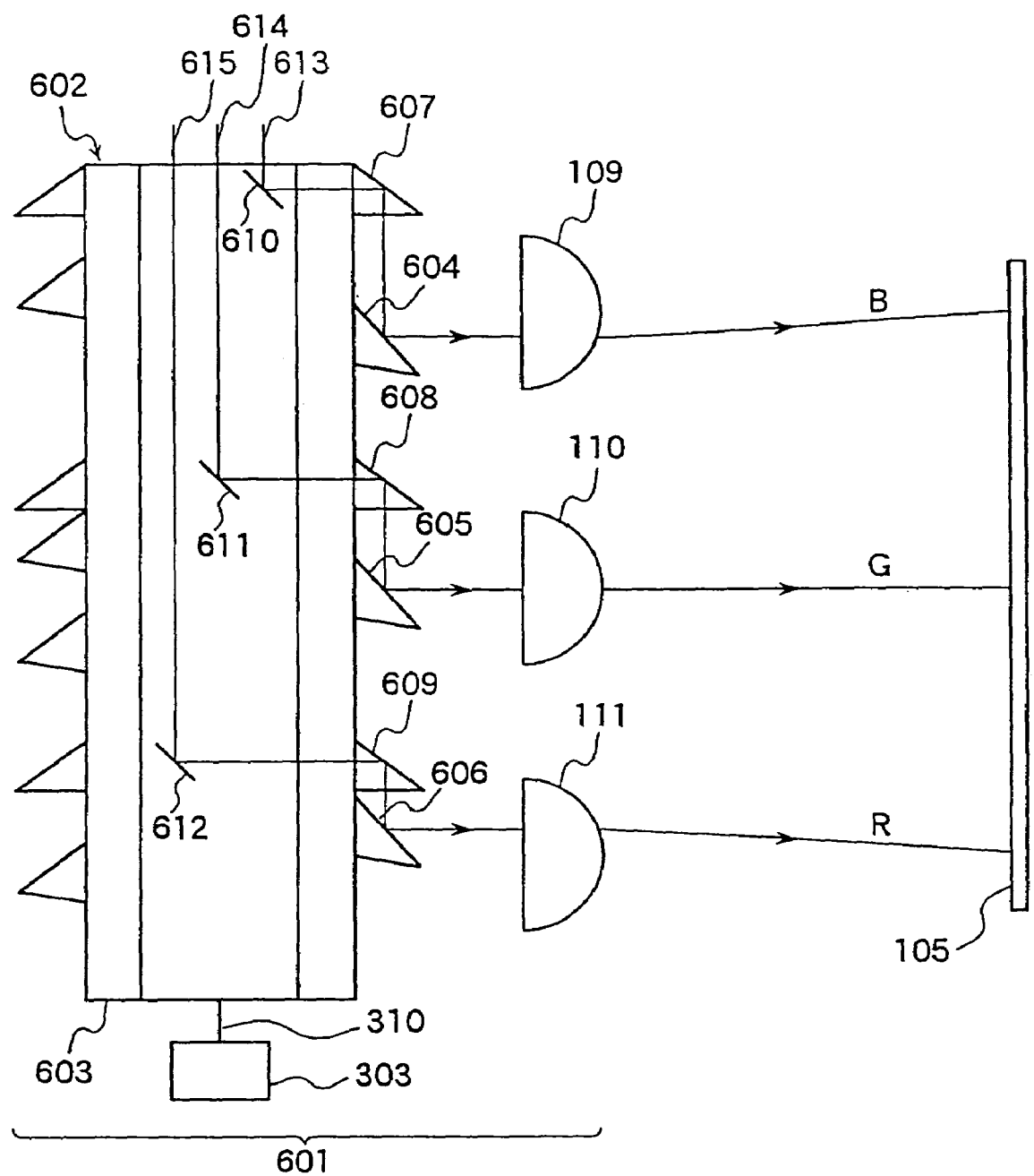
FIG. 6 is a cross-sectional view showing the schematic configuration of an illumination optical system of Embodiment 4 of the present invention.

FIG. 6 is a cross-sectional view showing an illumination optical system 601 of Embodiment 4 of the present invention that illuminates a region 105 to be illuminated by sequentially scanning the region 105 with a plurality of colors of light.

A combined optical scanner 602 is rotated by a motor 303, acting as a rotation system. The combined optical scanner 602 includes a cylindrical rotating body 603 having three first reflecting surfaces 604, 605 and 606 and three second reflecting surfaces 607, 608 and 609 on its side face, the first and second reflecting surfaces being provided alternately. Like the reflecting surfaces 304, 305 and 306 in Embodiment 2, each of the first reflecting surfaces 604, 605 and 606 is defined by the path traced by a segment that tilts at a predetermined angle (e.g., 45 degrees) with respect to a rotation axis 310 and moves along the rotation axis while rotating around the same. Each of the second reflecting surfaces 607, 608 and 609 is defined by the path traced by a segment that tilts at a predetermined angle (e.g., 45 degrees) with respect to the rotation axis 310 and rotates around the rotation axis in a plane perpendicular to the rotation axis so as to form part of a conical surface. Moreover, the first reflecting surfaces 604, 605 and 606 are formed on the rotating body 603 so that each of them has a predetermined phase difference in the rotational direction, i.e., they are shifted relative to one another by a rotation angle (phase) of 120 degrees with respect to the rotation axis.

There are three third reflecting surfaces 610, 611 and 612 in the central space of the hollow-cylindrical rotating body 603. Each of the third reflecting surfaces tilts at a predetermined angle with respect to the rotation axis 310.

A light source (not shown) emits red, green and blue light. Such a light source can be composed, e.g., of a white light source and a well-known means for separating white light into its spectral components.

Blue light 613 enters in the direction parallel to the rotation axis 310 and is reflected from the third reflecting surface 610 in the direction substantially perpendicular to the rotation axis 310 onto the second reflecting surface 607. The blue light reflected therefrom enters the first reflecting surface 604, is reflected in the direction perpendicular to the rotation axis 310, and passes through a scanning lens 109, thus scanning and illuminating the region 105. Similarly, green light 614 enters in the direction parallel to the rotation axis 310 and is reflected from the third reflecting surface 611 in the direction substantially perpendicular to the rotation axis 310 onto the second reflecting surface 608. The green light reflected therefrom enters the first reflecting surface 605, is reflected in the direction perpendicular to the rotation axis 310, and passes through a scanning lens 110, thus scanning and illuminating the region 105. Also, red light 615 enters in the direction parallel to the rotation axis 310 and is reflected from the third reflecting surface 612 in the direction substantially perpendicular to the rotation axis 310 onto the second reflecting surface 609. The red light reflected therefrom enters the first reflecting surface 606, is reflected in the direction perpendicular to the rotation axis 310, and passes through a scanning lens 111, thus scanning and illuminating the region 105.

In this case, scanning linearity becomes perfect when the first reflecting surfaces 604, 605 and 606 are formed so that the rotation angle is proportional to the amount of change in the first reflecting surfaces in the direction of height (i.e., the direction of the rotation axis 310).

Moreover, sequential scanning of the region 105 without overlapping colors can be achieved since the first reflecting surfaces 604, 605 and 606 are formed integrally with the rotating body 603 so that each of them has a predetermined phase difference in the rotational direction, i.e., they are shifted relative to one another by a rotation angle (phase) of 120 degrees with respect to the rotation axis.

It is preferable that the member of the combined optical scanner with a hollow portion (i.e., the rotating body 603) can transmit light and has a light transmittance of 70% or more to improve the efficiency of light utilization. This is because lower light transmittance increases loss resulting from the light absorption, which in turn reduces the light utilization efficiency.

In the above example, the number of scanning lenses is equal to that of first reflecting surfaces, and the scanning lenses are arranged to have one-to-one correspondence with the first reflecting surfaces. However, the present invention is not limited to this configuration. For example, a single scanning lens can be used to receive each color of light reflected from a plurality of first reflecting surfaces. It should be noted that, in such a case, the preferred optical system includes a reflecting mirror or prism for guiding the different colors of light reflected from the first reflecting surfaces to the single scanning lens and a relay lens so that each color of light has an equivalent optical path length.

Embodiment 5

Figure 7:
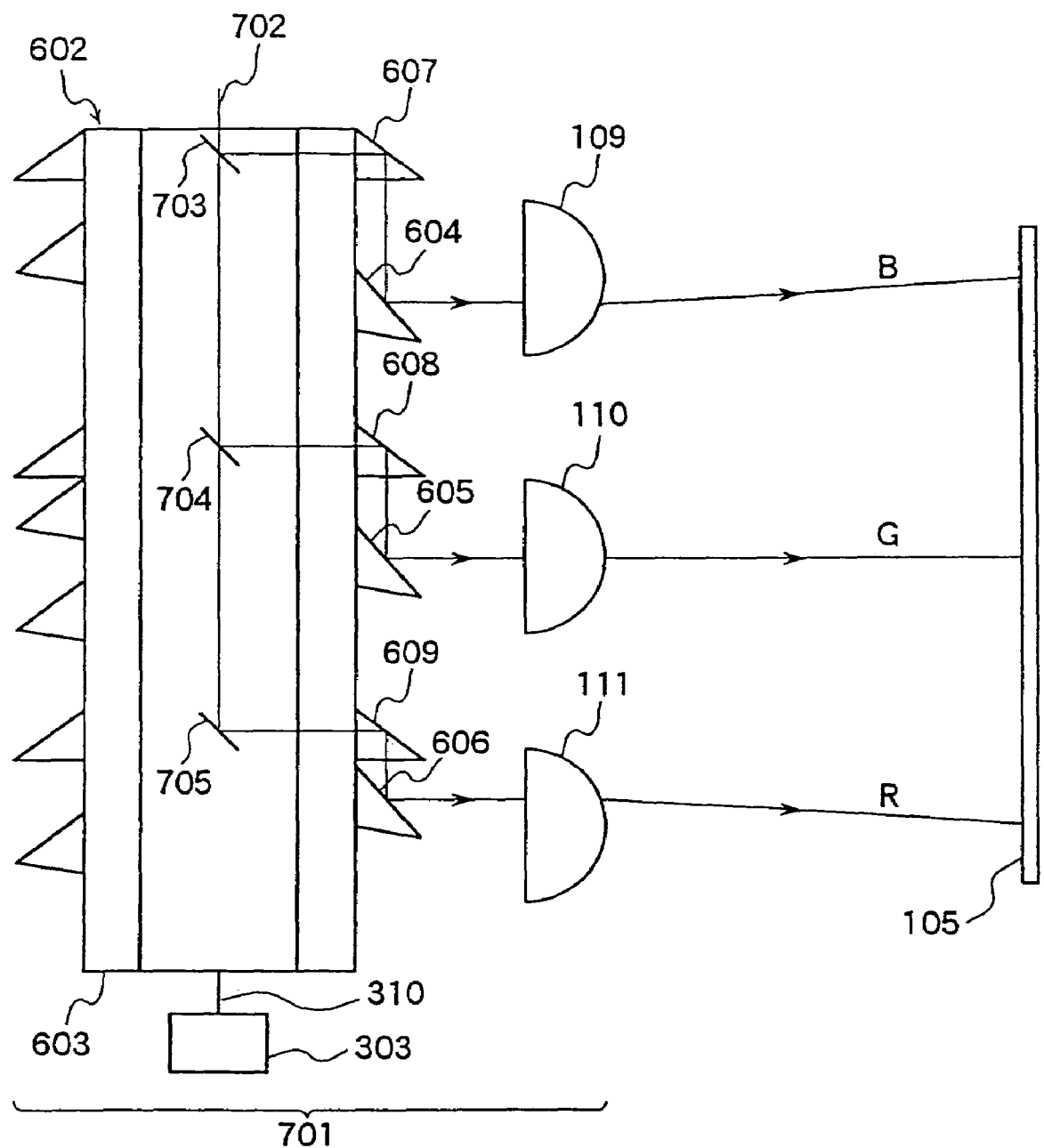
FIG. 7 is a cross-sectional view showing the schematic configuration of an illumination optical system of Embodiment 5 of the present invention.

FIG. 7 is a cross-sectional view showing an illumination optical system 701 of Embodiment 5 of the present invention that illuminates a region 105 to be illuminated by sequentially scanning the region 105 with a plurality of colors of light.

A combined optical scanner 602 is rotated by a motor 303, acting as a rotation system. The combined optical scanner 602 includes a cylindrical rotating body 603 having three first reflecting surfaces 604, 605 and 606 and three second reflecting surfaces 607, 608 and 609 on its side face, the first and second reflecting surfaces being provided alternately. Like the reflecting surfaces 304, 305 and 306 in Embodiment 2, each of the first reflecting surfaces 604, 605 and 606 is defined by the path traced by a segment that tilts at a predetermined angle (e.g., 45 degrees) with respect to a rotation axis 310 and moves along the rotation axis while rotating around the same. Each of the second reflecting surfaces 607, 608 and 609 is defined by the path traced by a segment that tilts at a predetermined angle (e.g., 45 degrees) with respect to the rotation axis 310 and rotates around the rotation axis in a plane perpendicular to the rotation axis so as to form part of a conical surface. Moreover, the first reflecting surfaces 604, 605 and 606 are formed on the rotating body 603 so that each of them has a predetermined phase difference in the rotational direction, i.e., they are shifted relative to one another by a rotation angle (phase) of 120 degrees with respect to the rotation axis.

There are three dichroic mirror surfaces 703, 704 and 705 in the central space of the hollow-cylindrical rotating body 603. Each of the dichroic mirror surfaces tilts at a predetermined angle with respect to the rotation axis 310, and they are arranged on a straight line.

White light 702 from a white light source (not shown) is incident on the center of the rotating body 603 in the direction parallel to the rotation axis and enters the dichroic mirror surface 703, where the blue light component is reflected in the direction substantially perpendicular to the rotation axis 310 onto the second reflecting surface 607. The blue light reflected therefrom enters the first reflecting surface 604, is reflected in the direction perpendicular to the rotation axis 310, and passes through a scanning lens 109, thus scanning and illuminating the region 105. Similarly, the light, after the blue light component has been filtered out, enters the dichroic mirror surface 704, where the green light component is reflected in the direction substantially perpendicular to the rotation axis 310 onto the second reflecting surface 608. The green light reflected therefrom enters the first reflecting surface 605, is reflected in the direction perpendicular to the rotation axis 310, and passes through a scanning lens 110, thus scanning and illuminating the region 105. Also, the remaining light, after the blue and green light components have been filtered out, enters the dichroic mirror surface 705, where the red light component is reflected in the direction substantially perpendicular to the rotation axis 310 onto the second reflecting surface 609. The red light reflected therefrom enters the first reflecting surface 606, is reflected in the direction perpendicular to the rotation axis 310, and passes through a scanning lens 111, thus scanning and illuminating the region 105.

In this case, scanning linearity becomes perfect when the first reflecting surfaces 604, 605 and 606 are formed so that the rotation angle is proportional to the amount of change in the first reflecting surfaces in the direction of height (i.e., the direction of the rotation axis 310).

Moreover, sequential scanning of the region 105 without overlapping colors can be achieved since the first reflecting surfaces 604, 605 and 606 are formed integrally with the rotating body 603 so that each of them has a predetermined phase difference in the rotational direction, i.e., they are shifted relative to one another by a rotation angle (phase) of 120 degrees with respect to the rotation axis.

It is preferable that the member of the combined optical scanner with a hollow portion (i.e., the rotating body 603) can transmit light and has a light transmittance of 70% or more to improve the efficiency of light utilization. This is because lower light transmittance increases loss resulting from the light absorption, which in turn reduces the light utilization efficiency.

As described above, the order of arrangement of the dichroic mirror surfaces from the white light incident side, i.e., the order of spectral reflection characteristics is blue, green, and red. This makes it possible to suppress unnecessary spectral components in red light, which is separated lastly, with a small number of layers of the dichroic mirror surfaces. Thus, an illumination optical system that achieves higher color purity can be provided at low cost.

Moreover, the efficiency of utilization of a red light component can be increased by arranging the spectral reflection characteristics in the order of red, green, and blue. Therefore, an illumination optical system that achieves higher light utilization efficiency can be provided even if a high-pressure mercury lamp is used, whose emission spectrum is low in the red light component.

The dichroic mirror surface 705, on which the light is incident lastly, may be replaced by a general reflecting surface, as long as the incident light does not contain unnecessary spectral components. The use of such a reflecting surface can provide the same illumination optical system as that described above.

In the above example, the number of scanning lenses is equal to that of first reflecting surfaces, and the scanning lenses are arranged to have one-to-one correspondence with the first reflecting surfaces. However, the present invention is not limited to this configuration. For example, a single scanning lens can be used to receive each color of light reflected from a plurality of first reflecting surfaces. It should be noted that, in such a case, the preferred optical system includes a reflecting mirror or prism for guiding the different colors of light reflected from the first reflecting surfaces to the single scanning lens and a relay lens so that each color of light has an equivalent optical path length.

Embodiment 6

Figure 8:
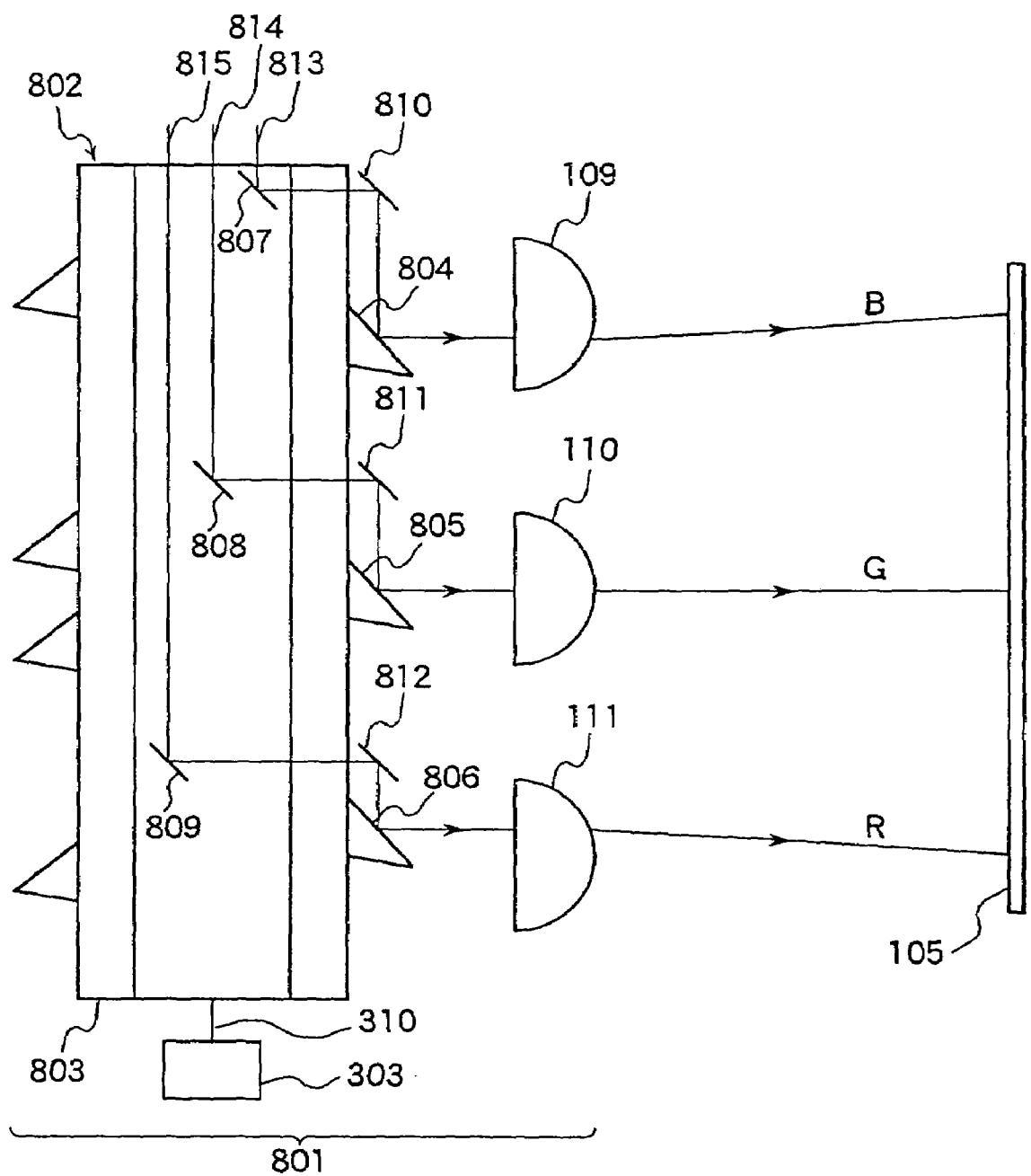
FIG. 8 is a cross-sectional view showing the schematic configuration of an illumination optical system of Embodiment 6 of the present invention.

FIG. 8 is a cross-sectional view showing an illumination optical system 801 of Embodiment 6 of the present invention that illuminates a region 105 to be illuminated by sequentially scanning the region 105 with a plurality of colors of light.

A combined optical scanner 802 is rotated by a motor 303, acting as a rotation system. The combined optical scanner 802 includes a cylindrical rotating body 803 having three first reflecting surfaces 804, 805 and 806 on its side face. Like the reflecting surfaces 304, 305 and 306 in Embodiment 2, each of the first reflecting surfaces 804, 805 and 806 is defined by the path traced by a segment that tilts at a predetermined angle (e.g., 45 degrees) with respect to a rotation axis 310 and moves along the rotation axis while rotating around the same. Moreover, the first reflecting surfaces 804, 805 and 806 are formed integrally with the rotating body 803 so that each of them has a predetermined phase difference in the rotational direction, i.e., they are shifted relative to one another by a rotation angle (phase) of 120 degrees with respect to the rotation axis, thus constituting the combined optical scanner.

There are three second reflecting surfaces 807, 808 and 809 in the central space of the hollow-cylindrical rotating body 803. Each of the second reflecting surfaces tilts at a predetermined angle with respect to the rotation axis 310.

In addition, three third reflecting surfaces 810, 811 and 812 are located at the positions opposite to the first reflecting surfaces 804, 805 and 806 of the combined optical scanner.

A light source (not shown) emits red, green and blue light. Such a light source can be composed, e.g., of a white light source and a well-known means for separating white light into its spectral components.

Blue light 813 enters the second reflecting surface 807 in the direction parallel to the rotation axis 310 and is reflected in the direction substantially perpendicular to the rotation axis 310 onto the third reflecting surface 810. The blue light reflected therefrom enters the first reflecting surface 804, is reflected in the direction perpendicular to the rotation axis 310, and passes through a scanning lens 109, thus scanning and illuminating the region 105. Similarly, green light 814 enters the second reflecting surface 808 in the direction parallel to the rotation axis 310 and is reflected in the direction substantially perpendicular to the rotation axis 310 onto the third reflecting surface 811. The green light reflected therefrom enters the first reflecting surface 805, is reflected in the direction perpendicular to the rotation axis 310, and passes through a scanning lens 110, thus scanning and illuminating the region 105. Also, red light 815 enters the second reflecting surface 809 in the direction parallel to the rotation axis 310 and is reflected in the direction substantially perpendicular to the rotation axis 310 onto the third reflecting surface 812. The red light reflected therefrom enters the first reflecting surface 806, is reflected in the direction perpendicular to the rotation axis 310, and passes through a scanning lens 111, thus scanning and illuminating the region 105.

In this case, scanning linearity becomes perfect when the first reflecting surfaces 804, 805 and 806 are formed so that the rotation angle is proportional to the amount of change in the first reflecting surfaces in the direction of height (i.e., the direction of the rotation axis 310).

Moreover, sequential scanning of the region 105 without overlapping colors can be achieved since the first reflecting surfaces 804, 805 and 806 are formed integrally with the rotating body 803 so that each of them has a predetermined phase difference in the rotational direction, i.e., they are shifted relative to one another by a rotation angle (phase) of 120 degrees with respect to the rotation axis.

It is preferable that the member of the combined optical scanner with a hollow portion (i.e., the rotating body 803) can transmit light and has a light transmittance of 70% or more to improve the efficiency of light utilization. This is because lower light transmittance increases loss resulting from the light absorption, which in turn reduces the light utilization efficiency.

In the above example, the number of scanning lenses is equal to that of first reflecting surfaces, and the scanning lenses are arranged to have one-to-one correspondence with the first reflecting surfaces. However, the present invention is not limited to this configuration. For example, a single scanning lens can be used to receive each color of light reflected from a plurality of first reflecting surfaces. It should be noted that, in such a case, the preferred optical system includes a reflecting mirror or prism for guiding the different colors of light reflected from the first reflecting surfaces to the single scanning lens and a relay lens so that each color of light has an equivalent optical path length.

Embodiment 7

Figure 9:
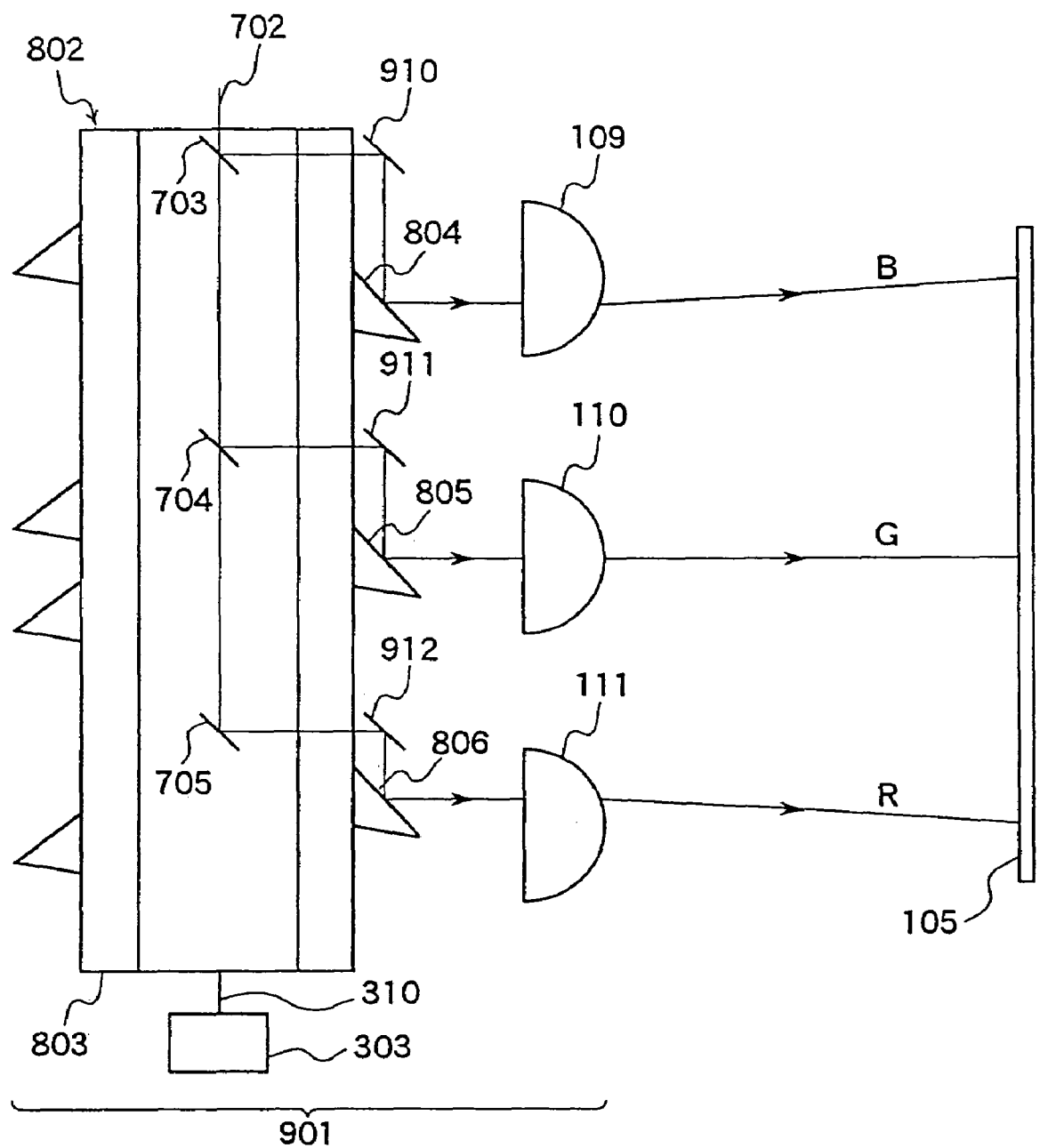
FIG. 9 is a cross-sectional view showing the schematic configuration of an illumination optical system of Embodiment 7 of the present invention.

FIG. 9 is a cross-sectional view showing an illumination optical system 901 of Embodiment 7 of the present invention that illuminates a region 105 to be illuminated by sequentially scanning the region 105 with a plurality of colors of light.

A combined optical scanner 802 is rotated by a motor 303, acting as a rotation system. The combined optical scanner 802 includes a cylindrical rotating body 803 having three first reflecting surfaces 804, 805 and 806 on its side face. Like the reflecting surfaces 304, 305 and 306 in Embodiment 2, each of the first reflecting surfaces 804, 805 and 806 is defined by the path traced by a segment that tilts at a predetermined angle (e.g., 45 degrees) with respect to a rotation axis 310 and moves along the rotation axis while rotating around the same. Moreover, the first reflecting surfaces 804, 805 and 806 are formed on the rotating body 803 so that each of them has a predetermined phase difference in the rotational direction, i.e., they are shifted relative to one another by a rotation angle (phase) of 120 degrees with respect to the rotation axis.

There are three dichroic mirror surfaces 703, 704 and 705 in the central space of the hollow-cylindrical rotating body 803. Each of the dichroic mirror surfaces tilts at a predetermined angle with respect to the rotation axis 310, and they are arranged on a straight line.

In addition, three second reflecting surfaces 910, 911 and 912 are located at the positions opposite to the first reflecting surfaces 804, 805 and 806 of the optical scanner.

White light 702 from a white light source (not shown) is incident on the center of the rotating body 802 in the direction parallel to the rotation axis 310 and enters the dichroic mirror surface 703, where the blue light component is reflected in the direction substantially perpendicular to the rotation axis 310 onto the second reflecting surface 910. The blue light reflected therefrom enters the first reflecting surface 804, is reflected in the direction substantially perpendicular to the rotation axis 310, and passes through a scanning lens 109, thus scanning and illuminating the region 105. Similarly, the light, after the blue light component has been filtered out, enters the dichroic mirror surface 704, where the green light component is reflected in the direction substantially perpendicular to the rotation axis 310 onto the second reflecting surface 911. The green light reflected therefrom enters the first reflecting surface 805, is reflected in the direction substantially perpendicular to the rotation axis 310, and passes through a scanning lens 110, thus scanning and illuminating the region 105. Also, the remaining light, after the blue and green light components have been filtered out, enters the dichroic mirror surface 705, where the red light component is reflected in the direction substantially perpendicular to the rotation axis 310 onto the second reflecting surface 912. The red light reflected therefrom enters the first reflecting surface 806, is reflected in the direction substantially perpendicular to the rotation axis 310, and passes through a scanning lens 111, thus scanning and illuminating the region 105.

In this case, scanning linearity becomes perfect when the first reflecting surfaces 804, 805 and 806 are formed so that the rotation angle is proportional to the amount of change in the first reflecting surfaces in the direction of height (i.e., the direction of the rotation axis 310).

Moreover, sequential scanning of the region 105 without overlapping colors can be achieved since the first reflecting surfaces 804, 805 and 806 are formed integrally with the rotating body 803 so that each of them has a predetermined phase difference in the rotational direction, i.e., they are shifted relative to one another by a rotation angle (phase) of 120 degrees with respect to the rotation axis.

It is preferable that the member of the combined optical scanner with a hollow portion (i.e., the rotating body 803) can transmit light and has a light transmittance of 70% or more to improve the efficiency of light utilization. This is because lower light transmittance increases loss resulting from the light absorption, which in turn reduces the light utilization efficiency.

As described above, the order of arrangement of the dichroic mirror surfaces from the white light incident side, i.e., the order of spectral reflection characteristics is blue, green, and red. This makes it possible to suppress unnecessary spectral components in red light, which is separated lastly, with a small number of layers of the dichroic mirror surfaces. Thus, an illumination optical system that achieves higher color purity can be provided at low cost.

Moreover, the efficiency of utilization of a red light component can be increased by arranging the spectral reflection characteristics in the order of red, green, and blue. Therefore, an illumination optical system that achieves higher light utilization efficiency can be provided even if a high-pressure mercury lamp is used, whose emission spectrum is low in the red light component.

The dichroic mirror surface 705, on which the light is incident lastly, may be replaced by a general reflecting surface, as long as the incident light does not contain unnecessary spectral components. The use of such a reflecting surface can provide the same illumination optical system as that described above.

In the above example, the number of scanning lenses is equal to that of first reflecting surfaces, and the scanning lenses are arranged to have one-to-one correspondence with the first reflecting surfaces. However, the present invention is not limited to this configuration. For example, a single scanning lens can be used to receive each color of light reflected from a plurality of first reflecting surfaces. It should be noted that, in such a case, the preferred optical system includes a reflecting mirror or prism for guiding the different colors of light reflected from the first reflecting surfaces to the single scanning lens and a relay lens so that each color of light has an equivalent optical path length.

The reflecting surfaces formed around the optical scanners or the combined optical scanner in Embodiments 1 to 7 can be achieved by evaporating a metallic material such as aluminum on the surface to be a reflecting surface.

Embodiment 8

Figure 10:
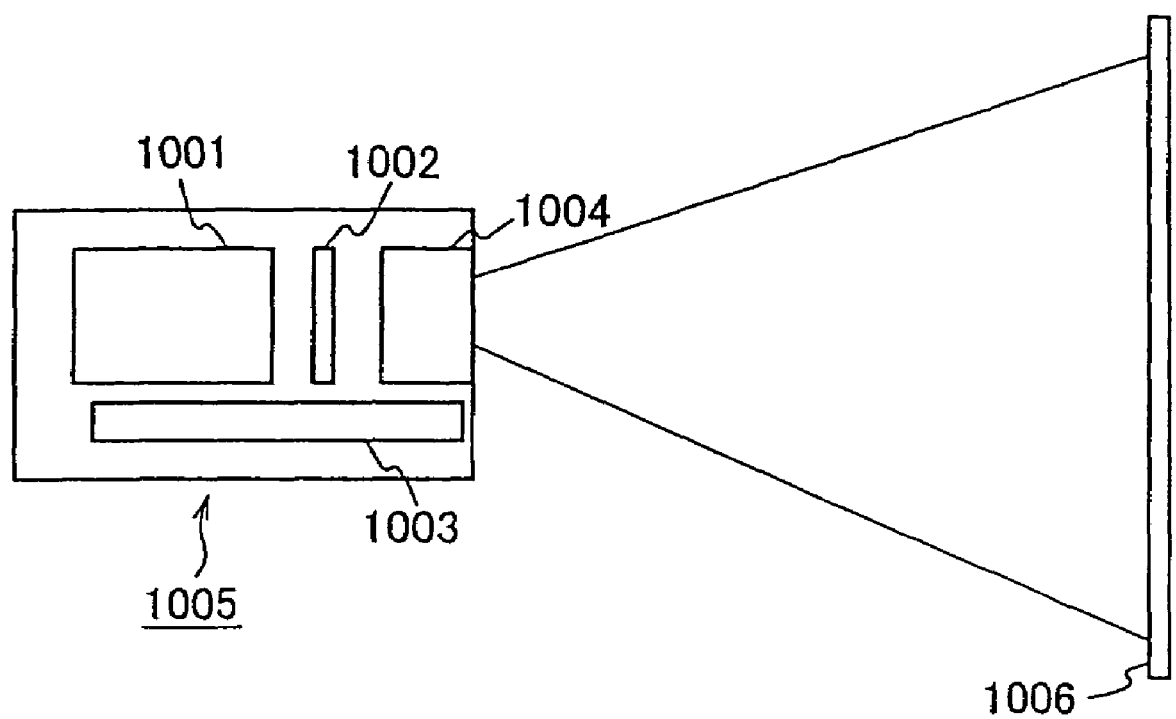
FIG. 10 shows the configuration of a projection video system of Embodiment 8 of the present invention.

FIG. 10 shows the configuration of a projection video system 1005 of Embodiment 8 of the present invention. The projection video system 1005 includes the following: the illumination optical system 1001 of the present invention; a light modulator 1002 to be scanned sequentially and illuminated with different colors of light by the illumination optical system 1001; an electronic circuit 1003 for driving the light modulator 1002; and projection optical system 1004 for projecting light modulated by the light modulator 1002. The projection video system 1005 magnifies and projects video information onto a screen 1006. As the illumination optical system 1001, any one of the illumination optical systems in Embodiments 1 to 7 can be used. The electronic circuit 1003 generates a driving signal suitable for the light modulator 1002, which is scanned sequentially with different colors of light, in accordance with a video signal, and thus drives the light modulator 1002. As the light modulator 1002, e.g., a transmission-type liquid crystal panel can be used.

The above configuration can provide a projection video system that is very valuable for industrial use. The reason for this is as follows: the configuration of the electronic circuit 1003 can be simplified due to the favorable scanning linearity of the illumination optical system 1001, the system can perform scanning with a small motor because of its reduced wind resistance, the noise is lowered, and the like.

Embodiment 9

Figure 11:
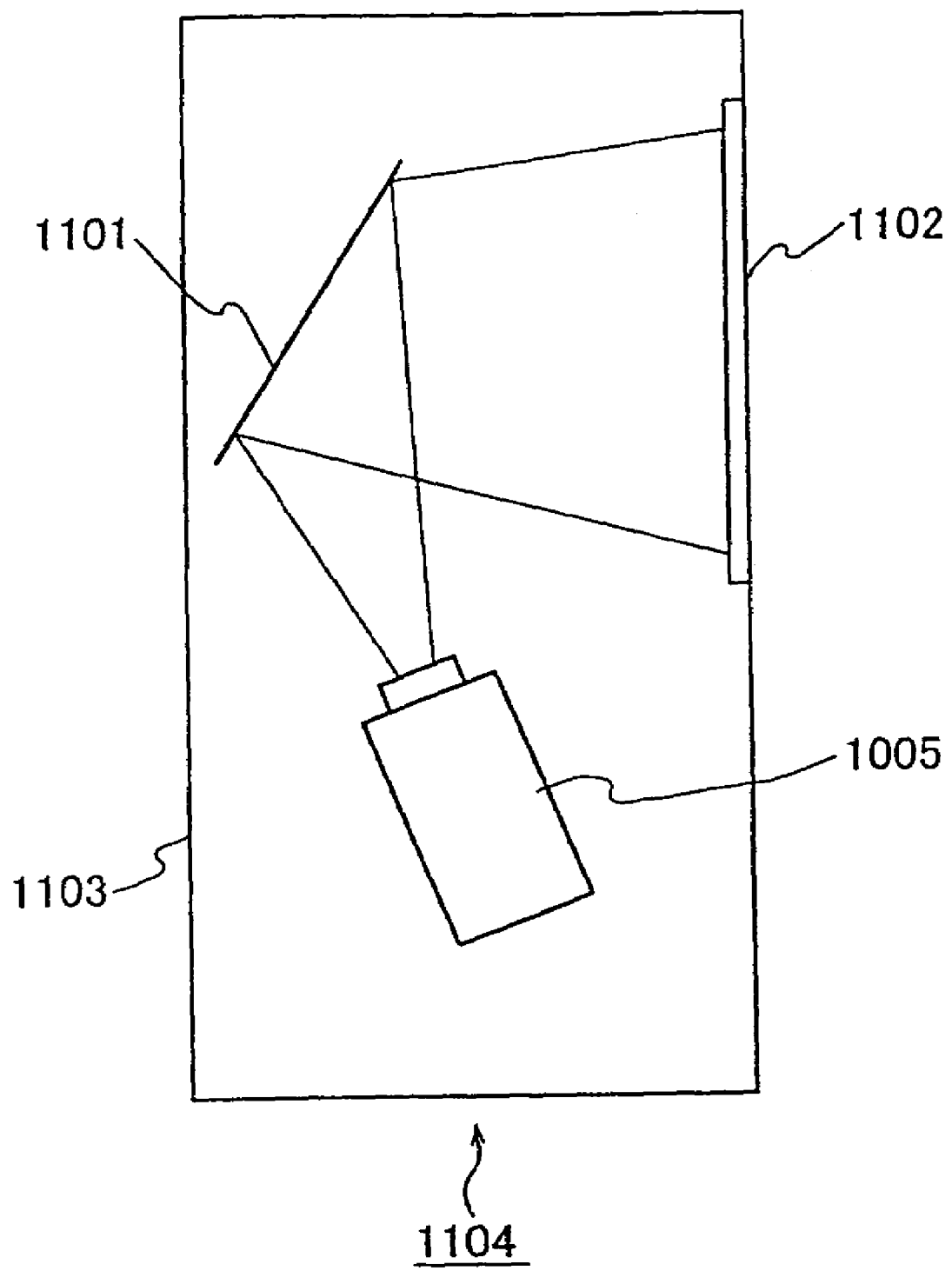
FIG. 11 shows the configuration of an integral-type video display of Embodiment 9 of the present invention.

FIG. 11 shows the configuration of an integral-type video display 1104 of Embodiment 9 of the present invention. The integral-type video display 1104 includes the projection video system 1005 of Embodiment 8, a reflecting mirror 1101, a transmission-type screen 1102, and a case 1103 for housing the projection video system 1005, the reflecting mirror 1101, and the screen 1102.

The above configuration can provide an integral-type video display that is very valuable for industrial use. The reason for this is as follows: the configuration of the electronic circuit can be simplified due to the favorable scanning linearity of the illumination optical system, the system can perform scanning with a small motor because of its reduced wind resistance, the noise is lowered, and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. An illumination optical system comprising:
   a light source for emitting a plurality of different colors of light;
   a combined optical scanner;
   a rotation system for rotating the combined optical scanner; and
   at least one scanning lens,
      wherein the combined optical scanner has a plurality of reflecting surfaces in a direction of a rotation axis, each reflecting surface being defined by a path traced by a segment that tilts at a predetermined angle with respect to the rotation axis and moves in the direction of the rotation axis while rotating round the rotation axis, and
      the different colors of light enter the respective reflecting surfaces of the combined optical scanner, are reflected therefrom, and pass through the scanning lens, so that a region to be illuminated is scanned sequentially with the different colors of light.

2. The illumination optical system according to claim 1, wherein the combined optical scanner has three reflecting surfaces that are arranged relative to one another at a predetermined phase difference around the rotation axis.

3. The illumination optical system according to claim 2, wherein the predetermined phase difference is 120 degrees.

4. The illumination optical system according to claim 1, wherein the illumination optical system comprises a plurality of scanning lenses, and the scanning lenses have one-to-one correspondence with the reflecting surfaces, and the different colors of light reflected from the reflecting surfaces enter their corresponding scanning lenses.

5. The illumination optical system according to claim 1, wherein the scanning lens is one in number, and all the different colors of light reflected from the reflecting surfaces enter the scanning lens.

* * * * *